United States Patent Office 3,444,102
Patented May 13, 1969

3,444,102
PROCESS FOR THE PRODUCTION OF A HIGH MOLECULAR WEIGHT POLYMER OF AN EPOXIDE USING A THREE COMPONENT CATALYST COMPRISING AN ORGANOZINC COMPOUND, AN ORGANOMAGNESIUM COMPOUND AND WATER
Teruhiko Ito, Naoshi Mitsui, and Seiichiro Maeda, Kakogawa-shi, and Kiyoshi Sawata, Hyogo-ken, Japan, assignors to Seitetsu Kagaku Co., Ltd., Hyogo-ken, Japan, a corporation of Japan
No Drawing. Filed Sept. 11, 1964, Ser. No. 395,943
Claims priority, application Japan, Sept. 21, 1963, 38/50,416; Oct. 21, 1963, 38/56,644, 38/56,645; Nov. 15, 1963, 38/61,441
Int. Cl. C08g 23/10, 23/14
U.S. Cl. 260—2    37 Claims

ABSTRACT OF THE DISCLOSURE

A process for producing a high molecular weight polymer of a monomeric 1,2-epoxide, which comprises polymerizing said epoxide with a three component catalyst consisting essentially of an organozinc compound, an organomagnesium compound and water in the presence or absence of at least one compound selected from the group consisting of ethers, thioethers and amines, which compound may be incorporated during preparation of the catalyst or during polymerization. By polymerizing the epoxide with the three component catalyst of the present invention, particularly when an ether and amine are added, a polymer having a high molecular weight, for example with an intrinsic viscosity of about 30, can be produced in a shorter time than required by the prior art two component catalyst consisting of an organozinc compound and water.

---

This invention relates to a method for producing high polymers or copolymers of epoxide, to high polymers or copolymers of epoxide thus produced and to a catalyst composition useful for producing such high polymers or copolymers of epoxide. More particularly this invention relates to a method for polymerizing an epoxide by use of a catalyst consisting of one or more organozinc compounds, one or more organomagnesium compounds and water, to such a method carried out in the presence of at least one substance selected from the group consisting of ether, thio-ether and amine, to high polymers or copolymers of epoxide thus produced and to a catalyst composition useful for producing such high polymers or copolymers of epoxide.

High polymers of epoxide are valuable substances having various uses and applications. For example, polyethylene oxide is useful as a dispersing agent for papermaking, a suspension stabilizing agent for suspension polymerization, a coagulating agent for emulsion polymerization products, a general coagulating agent, a thickener for paints and adhesives, water soluble film, water soluble fibers, a textile warp size, and a textile printing paste. Polymers and copolymers of epichlorohydrin, and copolymers of epoxide having unsaturated double bond and alkylene oxide such as ethylene oxide or propylene oxide are useful for synthetic rubbers and further are now under development for new uses and applications.

Generally speaking, the higher the degree of polymerization, the more valuable are the polymers and copolymers of the epoxide. For example, when polyethylene oxide is used as a dispersing agent for making Japanese paper, polymers having an intrinsic viscosity of less than 3, are not effective. Even in case of polymers having an intrinsic viscosity of greater than 3, the amount to be used can be reduced as the polymerization degree is increased. A polymer having intrinsic viscosity of 10 shows almost the same effect as 4 times the amount of a polymer having intrinsic viscosity of 6. When polyethylene oxide is used as a coagulant, the optimum amount varies depending upon the polymerization degree of the polymer. Generally speaking, its effectiveness increases rapidly as the polymerization degree increases. Accordingly high polymers show effectiveness even in much smaller amounts, in comparison with low polymers. In the measurement of minimum concentration necessary for obtaining the coagulating effect vs. aqueous suspension of lignin, a polyethylene oxide of intrinsic viscosity of 20 is required in an amount of 0.5 p.p.m., whereas the same polymer of intrinsic viscosity of 8 does not show the coagulating effect even at 500 p.p.m. When polyethylene oxide is used in film, the greater the degree of polymerization, so much less is the chance of spheroid being developed, and so much greater is the improvement of film properties. Since the viscosity of aqueous solution increases rapidly as the degree of polymerization increases, such a high polymer not only affords quantitatively the viscosity increasing effect even in small amounts, but also affords qualitatively a remarkable viscosity increasing effect which is entirely impossible using a low polymer.

It has been heretofore known that a two-component catalyst consisting of an organozinc compound and water, or a catalyst of an organomagnesium compound polymerizes epoxide. However the two-component catalyst consisting of an organozinc compound and water is extremely active and rapidly polymerizes epoxides, but the polymerization degree of resulting polymers is not high. Even under the most suitable conditions, resulting polymers have only an intrinsic viscosity of about 6. The catalyst of an organomagnesium compound yields polymers having an intrinsic viscosity of more than 10, but the polymerization rate obtainable by this catalyst is not high enough to be acceptable in commercial practice. For example, according to British Patent 937,164 (1963) a catalyst consisting of diethylzinc and water or alcohol polymerizes ethylene oxide and propylene oxide but the maximum intrinsic viscosity of resulting polymers is only 5.4. According to J. Chem. Soc. Japan, Ind. Chem. Sect., 66, 1148 (1963), 4.30 g. of ethylene oxide is polymerized in the presence of 0.166 g. of diethylmagnesium at a temperature of 35° C. for 8 hours, yielding a polymer having an intrinsic viscosity of 16.3. In spite of the extremely high monomer concentration, production of the polymer amounts to only 5.8 g. per gram of catalyst. There have been known also several other catalyst systems for producing polymers or copolymers of epoxide. For example some of them are a catalyst consisting of an organometallic compound having a component of metal belonging to the second and third groups of Mendelejeff's periodical table alone, metal alkoxide having the same component of metal alone, [British Patent 785,229 (1957), 785,053 (1957) and 793,065 (1958)], or admixture thereof with a suitable metal halide (J. Polymer Sci., 34 1931 (1959)) or with a metal oxide (J. Chem. Soc., Ind. Chem. Sect., 62 1269 (1959)) p. 6725.

The principal object of the present invention is therefore to provide a method for producing high moleculat weight polymers or copolymers of epoxide at high reaction rates. Another object of the present invention is to provide a method for producing high molecular weight polymers of ethylene oxide or propylene oxide having intrinsic viscosity of at least 1, preferably at least 4. A further object of the present invention is to provide a method for producing high molecular weight copolymer of ethylene oxide and propylene oxide. Still a further object of the present invention is to provide a method for producing copolymers of ethylene oxide or propylene oxide with an epoxide having a C to C double bond in its molecule such as allylglycidyl ether, butadiene monoxide or the like. Yet a further object of the present invention is to provide a method for producing copolymers of ethylene oxide or propylene oxide with an epoxide containing a halogen atom such as epichlorohydrin, epibromohydrin or the like. Yet a further object of the present invention is to provide polymers or copolymers resulting from the foregoing methods. Yet a further object of the present invention is to provide catalytic systems effective in obtaining the above-mentioned high molecular weight polymers or copolymers of epoxide.

These and other objects of the present invention will become apparent to those skilled in the art from the following description and claims.

According to the present invention, epoxides can be polymerized to high molecular weight polymers or copolymers by use of a three-component catalyst consisting of an organozinc compound represented by a formula of $R_5$—Zn—$R_6$, an organomagnesium compound represented by a formula of $R_7$—Mg—$R_8$ and water at remarkable speed and excellent polymer yield per unit of catalyst. When either the preparation of catalyst, the polymerization or both is conducted in the presence of at least one member selected from the group consisting of an ether represented by the formula

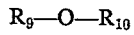

$$R_9—O—R_{10}$$

and thioether represented by the formula:

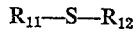

$$R_{11}—S—R_{12}$$

in the production of high molecular weight polymer of epoxide using the above-mentioned three-component catalyst, the production speed can be further increased, thus yielding polymers having improved polymerization degree and crystallinity. Further, when either the preparation of catalyst, the polymerization or both is conducted in the presence of at least one amine represented by the formula:

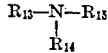

$$R_{13}—N—R_{15}$$
$$|$$
$$R_{14}$$

in the production of a high molecular weight polymer of epoxide using the above-mentioned three-component catalyst, the reaction time can be reduced, thus yielding polymers having improved polymerization degree and crystallinity. Further, when at least one ether represented by the formula:

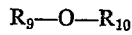

$$R_9—O—R_{10}$$

a thioether represented by the formula:

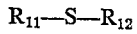

$$R_{11}—S—R_{12}$$

and an amine represented by the formula:

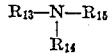

$$R_{13}—N—R_{15}$$
$$|$$
$$R_{14}$$

are simultaneously brought into the reacting system at arbitrary time during the operation consisting of catalyst preparation and/or polymerization in the production of high polymers of epoxide using the above-mentioned three-component catalyst, it is possible to produce polymers of epoxide having such high polymerization degree as no other polymer of epoxide has ever attained, and that at remarkable reaction rate. Furthermore, it is possible according to the present invention to produce a high molecular weight copolymer of ethylene oxide and propylene oxide, copolymer of ethylene oxide or propylene oxide with an epoxide containing C to C double bond in its molecule, such as allylglycidyl ether, butadiene monoxide or like epoxides containing halogen atom such as epichlorohydrin, epibromohydrin or the like.

Epoxides which are useful as a raw material of polymers or copolymers of the present invention are compounds having the general formula:

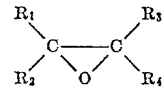

wherein $R_1$, $R_2$, $R_3$ and $R_4$ are members selected from the group consisting of hydrogen atoms, aliphatic, alicyclic and aromatic hydrocarbon residues having 1 to 6 carbon atoms, such residues in which 1 to all hydrogen atoms are substituted by halogen atoms and such residues containing linkages selected from the group consisting of ether and ester linkages in the primary chain of the hydrocarbon residues wherein the total of carbon and oxygen atoms constituting the primary chain is not more than 8. It goes without saying that all of the compounds, in which $R_1$ and $R_3$ are bonded at positions other than at the epoxide radical to form a residue, can also be used as the starting materials in the present invention.

Illustrative epoxides include, among others, ethylene oxide, propylene oxide, 1,2-epoxybutane, 2,3-epoxybutane, epichlorohydrin, epibromohydrin, trifluoromethylethylene oxide, cyclohexene oxide, methylglycidyl ether, phenylglycidyl ether, butadiene monoxide, butadiene dioxide, allylglycidyl ether, glycidyl acrylate, styrene oxide and the like. Copolymers of epoxide such as ethylene oxide or propylene oxide which are inexpensive and available in large quantities along with unsaturated epoxides such as butadiene monoxide or allylglycidyl ether can be processed in operations such as vulcanization and the like by use of the same method as in the case of common natural or synthetic rubber. Accordingly such copolymers are valuable in commerce.

Organozinc compounds which are used in the present invention are those having the general formula of $R_5$—Zn—$R_6$ (wherein $R_5$ and $R_6$ are each hydrocarbon residues having 1 to 6 carbon atoms).

Illustrative compounds include, among others, dimethylzinc, diethylzinc, di-n-propylzinc, diisopropylzinc, di-n-butylzinc, diisobutylzinc, ethyl-n-propylzinc, ethylisobutylzinc, dicyclohexylzinc, diphenylzinc and mixtures thereof.

Organomagnesium compounds used in the present invention are those having the general formula $R_7$—Mg—$R_8$ (wherein $R_7$ and $R_8$ are each hydrocarbon residues having 1 to 6 carbon atoms).

Illustrative compounds include, among others, dimethylmagnesium, diethylmagnesium, di-n-propylmagnesium, diisopropylmagnesium, di-n-butylmagnesium, diisobutylmagnesium, ethyl-n-propylmagnesium, ethylisobutylmagnesium, dicyclohexylmagnesium, diphenylmagnesium, and mixtures thereof.

Ethers which are brought, as additional compounds, to the reacting system during at least one of the catalyst preparation and/or polymerization steps, are compounds having at least one moiety represented by the general formula:

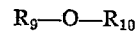

$$R_9—O—R_{10}$$

namely, those having at least one oxygen atom bonded via an ether linkage with two different carbon atoms, and wherein $R_9$ and $R_{10}$ are members selected from the group consisting of aliphatic, alicyclic, and aromatic hydrocarbon residues having 1 to 10 carbon atoms, and such residues containing a structure selected from the group consisting of an ether, a thioether, amino and a substituted amino radical. It goes without saying that compounds wherein $R_9$ and $R_{10}$ together form a cyclic structure with at least one oxygen atom are included in the ethers employed in the present invention.

Illustrative ethers include, among others, dimethyl ether, diethyl ether, di-n-propyl ether, diisopropyl ether, dibutyl ether, methyl ethyl ether, ethyl propyl ether, ethyl butyl ether, methylal, acetal, ethylene glycol dimethyl ether, diethylene glycol diethyl ether, anisole, phenetole, allyl phenyl ether, methyl naphthyl ether, ethyl benzyl ether, methyl tolyl ether, pyrogallol trimethyl ether, diphenyl ether, dicyclohexyl ether, ethyl cyclohexyl ether, tetrahydrofuran, 1,4-dioxane, α-trioxymethylene, morpholine, N-ethyl morpholine, various epoxides which can be used as monomers of the present invention, and mixtures thereof. As for such ethers used especially in the preparation of catalysts, even the epoxide which is the raw material of polymerization alone, affords an exceedingly active catalyst. Though an epoxide which belongs to ether and is a raw material of polymerization is always extant in the polymerization, the addition of still another ether increases the rate of polymerization and alters the degree of polymerization as well as the crystallinity of the resulting polymers. However, when a cyclic ether having more than one cyclic structure in its molecule and more than one oxygen atom united with two different carbon atoms in the atoms forming the said cyclic structure, especially epoxides, is used as the ether besides the starting epoxide during the time of polymerization reaction, it frequently happens that unwanted polymer or copolymer is formed. It is necessary to pay due attention to this point. Accordingly, it is convenient to have an ether other than epoxide present during the catalyst preparation and without removing this ether, to carry out the polymerization of epoxide in the presence of the said ether.

Thioethers used in the present invention are compounds having the general formula:

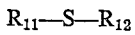

namely, those having at least one sulfur atom bonded to two different carbon atoms in their molecules, and wherein $R_{11}$ and $R_{12}$ are members selected from the group consisting of aliphatic, alicyclic and aromatic hydrocarbon residues having 1 to 10 carbon atoms, and such residues containing structures selected from the group consisting of a thioether, amino and a substituted amino radical.

It goes without saying that compounds wherein $R_{11}$ and $R_{12}$ together form a cyclic structure with at least one sulfur atom are included in the thioethers employed in the present invention.

Illustrative thioethers include, among others, dimethyl sulfide, diethyl sulfide, di-n-propyl sulfide, diisopropyl sulfide, dibutyl sulfide, dicyclohexyl sulfide, diphenyl sulfide, ditolyl sulfide, dibenzyl sulfide, dinaphthyl sulfide, methyl ethyl sulfide, ethyl propyl sulfide, methyl butyl sulfide, methyl cyclohexyl sulfide, thioanisole, thiophenetole, ethyl tolyl sulfide, methyl benzyl sulfide, thiophene, methyl thiophene, phenothiazine, N-methyl phenothiazine, thiomethylal, thioacetal, thioformaldehyde, thioacetaldehyde, dithioacetone, trithioacetone and mixtures thereof.

Amines employed in the present invention are represented by the general formula:

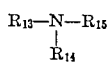

herein $R_{13}$ and $R_{15}$ are members selected from the group consisting of hydrogen atoms, aliphatic, alicyclic and aromatic hydrocarbon residues having 1 to 14 carbon atoms and such residues containing structures selected from the group consisting of an amino and a substituted amino radical excluding the case where all of $R_{13}$, $R_{14}$ and $R_{15}$ are hydrogen atoms. It goes without saying that compounds of the above formula wherein an optional two or all of $R_{13}$, $R_{14}$ and $R_{15}$ form a cyclic structure with at least one nitrogen atom are included in the amine employed in the present invention.

Illustrative amines include, among others, trimethylamine, triethylamine, tri-n-propylamine, triisopropylamine, tributylamine, methyldiethylamine, methylethylpropylamine, tricyclohexylamine, methyldicyclohexylamine, N,N-dimethylaniline, N,N-diethylaniline, triphenylamine, tribenzylamine, triethylenediamine, hexamethylenetetramine, N,N,N',N'-tetraethylethylenediamine, N,N,N',N'-tetramethylphenylenediamine, N,N,N',N'-tetramethylbenzidine, dimethylamine, diethylamine, dicyclohexylamine, methylcyclohexylamine, diphenylamine, phenylcyclohexylamine, N-methylaniline, N-ethylaniline, dibenzylamine, methylamine, ethylamine, propylamine, aniline, toluidine, carbazole, pyridine, quinoline, acridine, pyrimidine, ethylenediamine, diethylenediamine, benzidine, tolidine, triaminobenzene and mixtures thereof.

As aforementioned, polymers produced by use of the three-component catalyst according to the present invention, possess exceedingly high degree of polymerization degree. It is nearly the same as or more than that obtained by use of organomagnesium compound which has been considered to be a catalytic system capable of producing polymers of the highest polymerization degree ever known. Furthermore, the activity of this catalyst is extremely high. The polymerization rate obtained by using this catalyst is not only greater than that obtained with the organomagnesium compound catalyst but also greater than the two-component catalyst consisting of an organozinc compound and water which has been considered to be the most active of all catalytic systems ever known. It is now possible to polymerize ethylene oxide twice as fast with a three-component catalyst having a molar ratio of organozinc compound: organomagnesium compound: water of 1:0.1:1 than with the two-component catalyst having a molar ratio of organozinc compound: water at 1:1.

When water is present in the polymerization of epoxide using organomagnesium compound, the polymerization does not proceed. In the polymerization of epoxide using the two-component catalyst consisting of an organozinc compound and water, the highest activity is obtained when 1 mol of water is used with 1 mol of the organozinc compound. When the amount of water exceeds only the slightest amount, the activity is notably reduced, and in the vicinity of 1.5, the catalyst scarcely shows any activity.

Considering these points together with the fact that the organomagnesium catalyst provides high molecular weight polymers but at a low rate of polymerization and the fact that the two-component catalyst consisting of organozinc compound and water provides a high polymerization rate but polymers of relatively low molecular weight, it is surprising and beyond expectation that the three-component catalyst of the present invention consisting of an organozinc compound, an organomagnesium compound and water produces polymers of extremely high molecular weight in a very short time simultaneously with remarkably increased yield per unit catalyst. Moreover, the three-component catalyst containing 1.5 mols of water vs. 1 mol of organozinc compound shows nearly the same and even greater activity than the two-component catalyst containing 1 mol of water vs. 1 mol of organozinc compound. The unexpected results obtained herein clearly demonstrate that the three-component catalyst is not merely an aggregation of known catalyst components, but a new and useful catalyst of commercially significant value.

We have further discovered that when either or both of the catalyst preparation and polymerization steps is carried out in the presence of at least one member selected from the group consisting of an ether, a thioether and an amine in the polymerization of epoxide using the above-mentioned three-component catalyst, better control of the reaction is facilitated, the reaction time is shorter, the polymer yield per unit catalyst is greater and the polymerization degree of resulting polymer higher, simultaneously improving its crystallinity. When at least one member selected from the group consisting of an ether, a thioether and an amine is brought to the system during the time of catalyst preparation, it is possible to lower the temperature and shorten the time necessary to prepare the catalyst as compared with the case carried out in the absence of such an additive. When the catalyst thus prepared is used in polymerization or when polymerization is carried out in the presence of at least one member selected from the group consisting of an ether, a thioether and an amine, the reproducibility of the polymerization reaction becomes better, hardly any induction period is recognizable, the polymerization speed becomes greater, and the activity lasts longer, consequently making the polymer yield per catalyst unit greater.

Since the degree of polymerization and crystallinity of resulting polymer changes according to the kind, amount and time of addition of these additives, it is possible for one skilled in the art to produce a polymer of any desired molecular weight and crystallinity in a short period of time by the selection of the optimum reaction conditions.

More detailed description will be given as to this problem. As for the improvement of reproducibility, there is no appreciable difference between an ether, a thioether and an amine, but as for the improvement of polymerization velocity either an ether or a thioether is suitable but as for the improvement of polymerization degree or crystallinity, an amine is more suitable, of course the polymerization degree and crystallinity are improved by the addition of an ether or thioether alone but their effectiveness is less than when using an amine. For improving the polymerization degree and crystallinity, there is a limit to the addition amount of ether and thioether though it varies depending upon the type of ether or thioether employed. By varying the amount of these additives, the molecular weight rate can be increased but the polymerization and the crystallinity are frequently reduced. It is also possible to increase the polymerization rate by the addition of amine, but too great an amount of amine frequently lowers the polymerization rate.

In the polymerization of ethylene oxide or propylene oxide, it is possible to obtain an extremely high polymerization rate by use of a catalyst consisting of organozinc compound, organomagnesium compound and water. Further it is easy to increase the rate of polymerization several fold by the addition of an ether such as diethyl ether or 1,4-dioxane during catalyst preparation and or polymerization, though the optimum amount varies according to the polymerization conditions employed.

Further, as aforementioned, it is possible to obtain a high molecular weight polymer by polymerizing an epoxide in the presence of the three-components catalyst of the present invention, but when catalyst preparation and/or polymerization is carried out in the presence of amine, higher molecular weight polymers can be obtained. For example, the addition of a small amount of N,N-dimethylaniline in the polymerization of propylene oxide using the three-component catalyst consisting of diethylzinc, diethylmagnesium and water, increases the intrinsic viscosity of resulting polymer from up to about 5 to more than 10. Furthermore when at least one member selected from the group consisting of an ether and a thioether is used together with at least one amine, polymers having a molecular weight much higher than those obtained by addition of amine alone, can be produced at a rate greater than in the case when only an ether or thioether is added. For example, in the polymerization of ethylene oxide, the intrinsic viscosity of polymers obtained at room temperature and at atmospheric pressure without additive or with the addition of only a substance selected from the group consisting of an ether and a thioether is about 10. It is fairly high but the intrinsic viscosity of polymer is elevated to about 15 when an amine is added. By simultaneous use of an ether or a thioether under the same conditions, it is possible to produce high polymers having an intrinsic viscosity of as high as about 30, a viscosity not heretofore obtainable. The polymerization velocity in this case is also increased as compared with that obtained by addition an ether or thioether alone. It is most preferable in this case to prepare the catalyst in the presence of at least one substance selected from the group consisting of an ether and a thioether, and to add one or more different amines during the polymerization. For achieving mainly the effect of increasing the polymerization velocity, the addition at the time of catalyst preparation is more effective, and for achieving the effect of increasing the degree of polymerization, the addition at the time of polymerization is much more effective.

The intrinsic viscosity used as a measure of the degree of polymerization is obtained by plotting the quotient of the specific viscosity divided by concentration of the polymer in the solution against the concentration of the polymer in the solution zero concentration, the concentration being measured in grams of polymer per 100 milliliters of solvent. The specific viscosity is obtained by dividing the difference between the respective viscosities of the solution and solvent with the viscosity of the solvent. The greater the intrinsic viscosity the greater the degree of polymerization. The intrinsic viscosity used in the present invention to indicate the degree of polymerization of polyethylene oxide is measured at a temperature of 35° C., in an aqueous solution. The value obtained by dividing the specific viscosity by the concentration of the polymer in the solution is called reduced viscosity and can be used as a measure of the degree of polymerization.

As for the degree of polymerization of ethylene oxide polymers described in the literature, polymers are described as having a reduced viscosity of 61 when produced with a calcium amide catalyst (Japanese patent bulletin 1960–4236), a reduced viscosity of 56 when produced with a calcium amide ethylate (Japanese patent bulletin 1960–10148), and an intrinsic viscosity of about 17 when using a diethylmagnesium catalyst, [J. Chem. Soc. Japan, Ind. Chem. Sect. 66 1148 (1963)]. The reduced viscosity used as a measure of the degree of polymerization degree of the polymers produced with calcium amide and calcium amide ethylate is measured in a solution containing 0.2 g. of ethylene oxide polymer in 100 ml. of acetonitrile at a temperature of 30° C.

Comparing the reduced viscosity with intrinsic viscosity by aqueous solution used in the present invention at a temperature of 35° C., the intrinsic viscosity of 20 nearly corresponds to a reduced viscosity of 91 measured in a 0.2 g./100 ml. acetonitrile solution at a temperature of 30° C. The intrinsic viscosity of 30 readily obtainable according to the present invention is approximately 137 expressed by the above-mentioned reduced viscosity. It is, accordingly understood that such a high polymer as has heretofore been unknown can now be produced readily and quickly according to the present invention.

In preparing the three-component catalyst consisting of organozinc compound, organomagnesium compound and water, or in preparing the same catalyst in the presence of at least one substance selected from the group consisting of an ether, thioether and amine, all we have to do is mix the component in any arbitrary manner, but it is convenient to carry out the mixing in the presence of an inert medium. For example when a medium is used, it is possible to carry out the catalyst preparation readily at a condition e.g. such as at a temperature higher than the boiling points of catalyst starting material or lower than the melting points of catalyst starting material. When the polymerization is carried out in a suitable medium, it is convenient to carry out the catalyst preparation in this medium. Of course there is no need of the medium for catalyst preparation being the same as that for polymerization. It is possible to add the polymerization medium immediately after the catalyst preparation or if necessary after eliminating the medium for catalyst preparation.

When the catalyst preparation is carried out in the presence of at least one substance selected from the group consisting of an ether, thioether and amine, there is a case in which such a substance does not show harmful effects even when large amounts of the above-mentioned additives are present. In such a case, it is possible to prepare the catalyst using this substance as a medium.

Further it is possible to carry out the catalyst preparation in the polymerizable monomer while using the three-components of catalyst raw material alone or with a small amount of additives. In carrying out block polymerization, this method is preferable.

Illustrative mediums for catalyst preparation include aromatic hydrocarbons such as benzene, toluene, xylene, mesitylene, ethylbenzene, diethylbenzene, propylbenzene and the like and aliphatic hydrocarbons such as n-pentane, isopentane, n-hexane, isohexane, 3-methylpentane, 2,3-dimethylbutane, n-heptane, 2,2-dimethylpentane, 2-methylhexane, 3-methylhexane, n-octane, isooctane, n-nonane and the like and alicyclic hydrocarbons such as cyclobutane, cyclopentane, cyclohexane, cycloheptane, cyclo-octane, cyclononane, decalin, other alicyclic hydrocarbon derivatives having organic radicals mainly consisting of carbon and hydrogen, and mixtures of the foregoing compounds. However, all substances which are inert to resulting catalyst and additives if the latters are used, and which are liquid at the condition of catalyst preparation, can be used as mediums.

In preparing the catalyst, organozinc compound and organomagnesium compound can be used in arbitrary amount, preferably in the proportion of organozinc compounds: organomagnesium compounds=1:up to 2, more desirably at 1:0.01 to 0.5 in mol ratio. This proportion is dependant on the kinds of organozinc and organomagnesium compounds, and the quantity of these to be employed. But when water is used more than 2.5 mols of water per 1 mol total of organozinc compound and organomagnesium compound, the catalyst activity is exceedingly reduced. Accordingly it is preferable to use water in an amount less than the above-mentioned value.

When the catalyst preparation is carried out in the presence of at least one substance selected from the group consisting of an ether, thioether and amine, even a small amount of these substances e.g. 0.01 mol vs. 1 mol of organozinc compound and organomagnesium compound may, in most cases, bring about favorable effects, though the amount varies according to the kind of substance. The effect of the amount of substance upon polymerization rate, degree of polymerization and crystallinity of resulting polymer varies depending upon reaction temperature, pressure, reaction medium and other reaction condition.

The preparation of catalyst can be carried out at an arbitrary temperature, but usually the temperature ranges from −50 to 150° C. and atmospheric pressure is suitable. However in general, the use of higher temperatures can shorten the time necessary for preparing catalyst. If necessary, it is possible to carry out the catalyst preparation at super-atmospheric or sub-atmospheric pressure.

The catalyst preparation includes not only the simultaneous mixing of three components all at one time but also the mixing of the third component to the two components arbitrarily chosen and previously mixed. It is also possible to start polymerization with one or two arbitrary components and add the second and the third components or the third component during polymerization to complete polymerization. It is also possible to add one or two or all of the three components during the course of polymerization, in other words to carry out the catalyst preparation in the polymerization medium and continue the polymerization thereafter.

By use of the catalyst prepared according to the above-mentioned method, epoxides can be polymerized in the present invention, and the block polymerization, or the polymerization using a new solvent can be applied thereto. However it is convenient to select a suitable medium to use in the catalyst preparation and to use the same medium, as a polymerization medium. Especially it is convenient to use a suitable medium and additive (at least one substance selected from the group consisting of an ether, a thioether and an amine) in the catalyst preparation and to use the same medium and the same additive in the polymerization. It is also convenient to use a suitable medium in the polymerization as in the catalyst preparation. The use of a suitable medium frequently affords the advantage that the polymerization can be carried out readily at a condition such as at a temperature higher than the boiling point of the monomer or lower than the melting point of the monomer.

As a polymerization medium, a substance which is inert to the catalyst, monomer, resulting polymer, and additives if they are used, and which is liquid at the condition of polymerization, is generally used. Most of the substances suitable as polymerization medium can be divided into two groups; the one which dissolves both monomer and polymer and the other which dissolves monomer but not polymer. Mixtures of these two group compounds can also be used. When an additive happens to be a substance which is not harmful even when it is existent in a large amount, it is possible to make that additive conduct both functions of a additive and medium.

Illustratives of two group compounds in the case of ethylene oxide polymerization will be shown. Mediums capable of dissolving both include aromatic hydrocarbons such as benzene, toluene, xylene, mesitylene, ethylbenzene, diethylbenzene, propylbenzene, cumene and mixture thereof. Mediums capable of dissolving monomer but not polymer include aliphatic hydrocarbon such as n-pentane, isopentane, other pentanes, n-hexane, isohexane, 3-methylpentane, 2,3-dimethylbutane, other hexanes, n-heptane, 2,2-dimethylpentane, 2-methylhexane, 3-methylhexane, other heptanes, n-octane, isooctane, other octanes, nonanes, decanes, undecanes, dodecanes, and the like, and alicyclic hydrocarbons such as cyclobutane, cyclopentane, cycloheptane, cyclooctane, cyclononane, decaline and alkyl derivatives of such alicyclic hydrocarbons, and mixtures of such aliphatic and alicyclic hydrocarbons.

Further, as for the solubility of ethers used in the present invention, it varies according to the polymerization temperature. 1,4-dioxane, anisole, ethylene glycol dimethyl ether, propylene glycol dimethyl ether, diethylene glycol diethyl ether and the like dissolve both the monomer and polymer in the polymerization of ethylene oxide. Dialkyl ethers such as diethyl ether, di-n-propyl ether, diisopropyl ether, dibutyl ether dissolve monomer of ethylene oxide but not polymer.

Of the above-mentioned two groups of medium, the use of the latter, namely, the medium capable of dissolving monomer but not polymer is convenient. When the former, namely the medium capable of dissolving resulting polymer, is used, the resulting polymer swells or dissolves in the medium and becomes a dough-like substance or solution of low concentration, depending upon the amount of medium used.

When the amount of medium used is small, the viscosity of reaction system sharply rises, as the reaction proceeds, and resulting polymer becomes a dough-like substance which makes the agitation difficult. On this account the contact of catalyst with monomer becomes difficult and the reaction rate is exceedingly reduced. This also makes the polymer yield per catalyst unit lower. Furthermore, since the resulting polymer adheres to the reaction vessel, it is difficult to take it out of the vessel. Such troublesome operations as dividing dough-like substance into pieces, elimination and recovery of medium and the like become necessary to obtain polymers. As the amount of medium used increases, the viscosity of reaction system is gradually reduced and the advancement of reaction becomes smooth. However the use of large amount of medium necessitates the use of a larger reaction vessel and a greater amount of medium used per unit of polymer. There is no doubt about such being disadvantageous in commercial operation. The effect of the slightest amount of water and other impurity existing in the medium cannot be neglected.

When a medium capable of dissolving monomer but not polymer is used in the polymerization of epoxides, intimate contact between catalyst and monomer is enhanced and the reaction proceeds smoothly. Resulting polymers precipitate as granulated solid without being dissolved, or a suspension formed by agitation. The viscosity of the reaction system hardly changes. By charging additional monomer into the reaction system, the reaction further advances. When the agitation is stopped, resulting polymer precipitates. In this case, the amount of resulting polymer per unit of catalyst is remarkably increased. Since the resulting polymer does not adhere to the walls of the reaction vessel or the like, it is easy to take it out. Since the resulting polymers are in granular form, there is no need of such after-treatments as comminution. Since the larger part of the medium is readily recovered by filtration or centrifugal separation, the amount of catalyst used, the volume of reaction vessel and the amount of medium used per resulting polymer can be extremely small, and the purification of resulting polymer is simplified. These are advantageous points brought about by the method using a medium in which the polymer is insoluble.

Also in the case when a large amount of additive is to be used during polymerizaton, is used or when a mixture of two kinds of medium belonging to both groups is used, it is convenient to arrange a combination in such a way that the system as a whole dissolves monomer but not polymer.

The polymerization reaction can be carried out at various temperatures. For example in the polymerization of ethylene oxide, the temperature ranges from $-50°$ to $+150°$ C. preferably form $-20°$ to $100°$ C. and reaction pressures in the neighborhood of atmospheric pressure are used. Needless to say, the polymerization can be carried out at super- or sub-atmospheric pressure.

In both of the operations, i.e. catalyst preparation and polymerization, the method of the present invention can be put into practice advantageously, regardless of whether these operations are carried out in a batch or continuous manner.

It goes without saying that when additives are used, more than two kinds of substance selected from the group consisting of an ether, a thioether and an amine can be used. As for the method of adding additives, besides the method in which additives are present during the catalyst preparation and or polymerization, it is possible to adopt the method in which additives are added or removed in the course of operations by suitable means. It is also possible to add another additive to carry out polymerization after removing or without removing the additive used in the catalyst preparation. Especially preferable is the method in which the catalyst preparation is carried out by use of at least one substance selected from the group consisting of an ether and thioether, and the polymerization is carried out after adding at least one kind of amine. Further it is possible to add or to substitute a new additive during the course of catalyst preparation and/or polymerization.

The following examples illustrate the process of the present invention which, however, is not to be construed as limited to details described therein.

Example 1

After replacing air by nitrogen, a polymerization vessel equipped with a blowing pipe of ethylene oxide and stirrer, was charged with 150 ml. of n-heptane, 0.03 mol of diethylzinc, 0.03 mol of water and 0.015 mol of diethylmagnesium. While stirring, the temperature of the mixture was raised to 75° C. in 40 minutes and while continuing stirring, this temperature was maintained to complete the catalyst preparation. At this temperature and while still stirring, ethylene oxide was continuously blown. In several minutes after starting blowing, the precipitation of polymer started, and even after 240 minutes, the polymerization could be continued without any trouble. In 240 minutes, the blowing of ethylene oxide was stopped and the polymer was collected, by which 23 g. of polymer were produced. The intrinsic viscosity of this polymer measured in aqueous solution at a temperature of 35° C. was 4.0. The blowing speed of ethylene oxide was controlled at such an extent as a small quantity of ethylene oxide flows out of the polymerization vessel constantly and the quantity of ethylene oxide in the reaction system maintained the saturated state under atmospheric pressure.

Control 1.—Polymerization was carried out by the same method as in Example 1 but without employing diethylmagnesium whereby 20 g. of polymer having an intrinsic viscosity of 2.4 were produced.

Control 2.—Polymerization was carried out by the method of Example 1 but without employing diethylzinc and water, whereby no polymer was obtained.

Example 2

150 ml. of benzene, 0.03 mol of diethylzinc, 0.04 mol of water and 0.01 mol of diethylmagnesium were charged to the same polymerization vessel as in Example 1 under the atmosphere of nitrogen and a catalyst was prepared by stirring for 120 minutes at room temperature. Heating was started and while stirring at a temperature of 70° C., ethylene oxide was blown. In about 20 minutes after starting blowing, almost all the content became dough-like substance which made the continuation of reaction difficult. The blowing of ethylene oxide was stopped and resultant product was disintegrated in petroleum ether, whereby 4 g. of polymer having an intrinsic viscosity of 4.3 were obtained.

Example 3

400 ml. of commercial gasoline, 0.01 mol of diethylzinc, 0.0025 mol of diethylmagnesium and 0.012 mol of water were charged to the same polymerization vessel as in Example 1 under the atmosphere of nitrogen. After preparing catalyst by stirring for 240 minutes at room temperature, 100 ml. of ethylene oxide was charged. After stirring for 240 minutes at room temperature, and allowing to stand overnight, the polymerization was carried out, whereby 46 g. of polymer having an intrinsic viscosity of 10.1 was obtained.

Control 3.—Without using diethylmagnesium and reducing the amount of water to 0.01 mol in Example 3, the polymerization was carried out whereby 42 g. of polymer having an intrinsic viscosity of 4.4 were obtained. When water was used without reducing its amount, i.e., in an amount 0.012 mol, no polymer was obtained.

Example 4

Using 0.03 mol of diisopropylzinc instead of 0.03 mol of diethylzinc, and 0.01 mol of dimethylmagnesium instead of 0.015 mol of diethylmagnesium in Example 1, the polymerization was carried out whereby 19 g. of polymer having an intrinsic viscosity of 3.8 was obtained.

Example 5

Polymerization of ethylene oxide by use of the catalyst prepared in the presence of ethylene oxide.

150 ml. of n-heptane, 0.03 mol of diethylzinc, 0.015 mol of diethylmagnesium and 0.03 mol of water were charged under the atmosphere of nitrogen to the same polymerization vessel as in Example 1. Then the blowing of ethylene oxide was started and while stirring, the temperature was raised to 75° C. in 40 minutes. The blowing of ethylene oxide and stirring were continued and the polymerization of ethylene oxide was carried out. In this instance the precipitation of polymer started approximately at the same time of the temperature rise. In 180 minutes the polymerization was stopped and resulting product was collected whereby 29 g. of polymer having intrinsic viscosity of 4.5 were obtained. When the polymerization was carried out while increasing the amount of n-heptane to 450 ml., 32 g. of polymer having an intrinsic viscosity of 4.3 were obtained.

Example 6

Polymerization of ethylene oxide in the presence of diisopropyl ether, using the catalyst prepared in the presence of diisopropyl ether and ethylene oxide.

450 ml. of n-heptane, 0.3 mol of diisopropyl ether, 0.03 mol of diethylzinc, 0.03 mol of diethylmagnesium, and 0.04 mol of water were charged under the atmosphere of nitrogen to the same polymerization vessel as in Example 1 at room temperature. Then the blowing of ethylene oxide was started and while stirring, the temperaure was raised to 70° C. in 40 minutes. The blowing of ethylene oxide and stirring were continued thereby to carry out the polymerization of ethylene oxide. In 180 minutes the polymerization was stopped and 116 g. of resulting polymer having an intrinsic viscosity of 4.6 were obtained.

Example 7

Polymerization of ethylene oxide in the presence of diethyl ether, using a catalyst prepared in the presence of diethyl ether.

450 ml. of n-heptane, 0.15 mol of diethyl ether, 0.03 mol of diethylzinc, 0.005 mol of diethylmagnesium and 0.033 mol of water were charged under the atmosphere of nitrogen at room temperature to the same polymerization vessel as in Example 1 and while stirring, the temperature was raised to 70° C. in 40 minutes. While stirring at this temperature, the polymerization was carried out by blowing ethylene oxide. The polymerization was stopped in 180 minutes and 64 g. of polymer having an intrinsic viscosity of 4.5 were obtained.

Example 8

Polymerization of ethylene oxide in the presence of diisopropyl ether, using a catalyst prepared in the presence of ethylene oxide.

450 ml. of n-heptane, 0.03 mol of diethylzinc, 0.01 mol of diethylmagnesium and 0.031 mol of water were charged under the atmosphere of nitrogen at room temperature to the same polymerization vessel as in Example 1. The blowing of ethylene oxide was started immediately and after raising the temperature to 70° C. in 40 minutes, 0.09 mol of diisopropyl ether was added. While continuing the blowing of ethylene oxide and stirring, the polymerization of ethylene oxide was carried out and 66 g. of polymer having an intrinsic viscosity of 4.8 were obtained in 180 minutes.

Example 9

Polymerization of ethylene oxide in the presence of α-trioxymethylene, using a catalyst prepared in the presence of ethylene oxide and α-trioxymethylene.

400 ml. of n-heptane, 50 ml. of benzene, 0.09 mol of α-trioxymethylene, 0.03 mol of diethylzinc, 0.007 mol of diethylmagnesium, and 0.033 mol of water were charged under the atmosphere of nitrogen at room temperature to the same polymerization vessel as in Example 1. The blowing of ethylene oxide was started and while stirring, the temperature was raised to 70° C. in 40 minutes.

Continuing the blowing of ethylene oxide and stirring, the polymerization of ethylene oxide was carried out, whereby 88 g. of polymer having an intrinsic viscosity of 5.1 were obtained.

Example 10

Polymerization of ethylene oxide in the presence of 1,4-dioxane, using a catalyst prepared in the presence of 1,4-dioxane.

400 ml. of commercial gasoline, 14 ml. of 1,4-dioxane, 0.01 mol of diethylzinc, 0.0025 mol of diethylmagnesium and 0.012 mol of water were charged under the atmosphere of nitrogen to the same polymerization vessel as in Example 1. After preparing catalyst by stirring for 240 minutes at a temperature of 25° C., 100 ml. of ethylene oxide were charged and the content was left to stand overnight to effect polymerization, whereby 62 g. of polymer having an intrinsic viscosity of 11.5 were obtained.

Example 11

Polymerization of ethylene oxide in the presence of thiophene, using a catalyst prepared in the presence of ethylene oxide and thiophene.

450 ml. of n-heptane, 0.03 mol of thiophene, 0.03 mol of diethylzinc, 0.01 mol of diethylmagnesium and 0.03 mol of water were charged under the atmosphere of nitrogen at room temperature to the same polymerization vessel as in Example 1. The blowing of ethylene oxide was started immediately and while stirring, the temperature was raised to 70° C. in 40 minutes. Continuing the blowing of ethylene oxide and stirring to carry out the polymerization, there were obtained 48 g. of polymer having an intrinsic viscosity of 4.7 in 180 minutes.

Example 12

Polymerization of ethylene oxide by use of a catalyst prepared in the presence of dimethyl sulfide.

450 ml. of n-heptane, 0.015 mol of dimethyl sulfide, 0.03 mol of diethylzinc, 0.01 mol of diethylmagnesium and 0.03 mol of water were charged under the atmosphere of nitrogen at room temperature to the same polymerization vessel as in Example 1. While stirring, the temperature was raised to 70° C. in 40 minutes. At this temperature, nitrogen was blown to the reaction system to drive off free dimethyl sulfide and subsequently the blowing of ethylene oxide was started and the polymerization was carried out, whereby 57 g. of polymer having an intrinsic viscosity of 4.6 were obtained in 180 minutes.

Example 13

Polymerization of ethylene oxide with the addition of large amount of diisopropyl ether for the purpose of simultaneously performing the function of medium.

450 ml. of diisopropyl ether, 0.03 mol of diethylzinc, 0.01 mol of diethylmagnesium and 0.027 mol of water were charged under the atmosphere of nitrogen at room temperature to the same polymerization vessel as in Example 1. The blowing of ethylene oxide was immediately started and while stirring, thte temperature is raised to 60° C. in 40 minutes. Continuing the blowing of ethylene oxide and stirring, at this temperature, the polymerization of ethylene oxide was carried out, whereby 45 g. of polymer having an intrinsic viscosity of 4.1 were obtained in 180 minutes.

Example 14

Polymerization of ethylene oxide with the addition of large amounts of 1,4-dioxane for the purpose of simultaneously performing the function of medium.

450 ml. of 1,4-dioxane, 0.03 mol of dimethylzinc, 0.015 mol of dibutylmagnesium and 0.024 mol of water were charged under the atmosphere of nitrogen at room temperature to the same polymerization vessel as in Example 1. While stirring, the temperature was raised to 70° C. in 40 minutes. When the blowing of ethylene oxide was started, the reaction product became viscous in several minutes and since the stirring became difficult, the blowing of ethylene oxide was stopped. The resulting product was disintegrated in petroleum ether, whereby 20 g. of polymer having an intrinsic viscosity of 4.2 was obtained.

In this instance, when the reacting mixture was cooled down below the boiling point of ethylene oxide, and left to stand after charging with a large amount of ethylene oxide, it was possible to continue further the polymerization.

Example 15

Polymerization of ethylene oxide in the presence of N,N-dimethylaniline, using a catalyst prepared in the presence of N,N-dimethylaniline.

150 ml. of n-heptane, 0.06 mol of N,N-dimethylaniline, 0.03 mol of diethylzinc, 0.015 mol of diethylmagnesium, and 0.03 mol of water were charged under the atmosphere of nitrogen, at room temperature to the same polymerization vessel as in Example 1. While stirring, the temperature was raised to 75° C. in 40 minutes. At this temperature and while stirring the ethylene oxide was blown to carry out polymerization.

Almost at the same time with the temperature rise, the precipitation of polymer started. In 180 minutes, the polymerization was stopped and 37 g. of polymer having an intrinsic viscosity of 7.4 were obtained.

When the amount of n-heptane was increased to 450 ml., 39 g. of polymer having an intrinsic viscosity of 7.0 were obtained after polymerization.

Example 16

Polymerization of ethylene oxide in the presence of N,N-diethylaniline.

400 ml. of commercial gasoline, 0.01 mol of diethylzinc, 0.0025 mol of diethylmagnesium and 0.012 mol of water were charged under the atmosphere of nitrogen to the same polymerization vessel as in Example 1. After preparing the catalyst by continuing stirring at a temperature of 25° C. for 300 minutes, 100 ml. of ethylene oxide, and 0.05 mol of N,N-diethylaniline were charged and allowed to stand overnight to carry out the polymerization, whereby polymer having an intrinsic viscosity of 15.2 was obtained.

Example 17

Polymerization of ethylene oxide by use of a catalyst prepared in the presence of dimethylamine.

450 ml. of n-heptane, 0.005 mol of dimethylamine, 0.03 mol of dimethylzinc, 0.01 mol of diisopropylmagnesium and 0.027 mol of water were charged under the atmosphere of nitrogen to the same polymerization vessel as in Example 1. After stirring for 300 minutes at a temperature of 25° C., the temperature was raised to 70° C. in 40 minutes. At this temperature, nitrogen was blown to the reacting system to drive off free dimethyl amine and subsequently the blowing of ethylene oxide was started to polymerize it, whereby 25 g. of polymer having an intrinsic viscosity of 8.2 were obtained in 180 minutes.

Example 18

Polymerization of ethylene oxide in the presence of N,N-dimethylaniline, using a catalyst prepared by adding N,N-dimethylaniline and ethylene oxide.

450 ml. of n-heptane, 0.06 mol of N,N-dimethylaniline, 0.03 mol of diethylzinc, 0.015 mol of diethylmagnesium and 0.03 mol of water were charged under the atmosphere of nitrogen at room temperature to the same polymerization vessel as in Example 1. The blowing of ethylene oxide was immediately started and while stirring, the temperature was raised to 75° C. in 40 minutes. Continuing the blowing of ethylene oxide and stirring, the polymerization of ethylene oxide was carried out. At almost the same time with the temperature rise, the precipitation of polymer started. In 180 minutes after temperature rise, the polymerization was stopped, whereby 59 g. of polymer having an intrinsic viscosity of 12.3 were obtained.

Example 19

Polymerization of ethylene oxide in the presence of 1.4-dioxane, and N,N-diethylaniline, using a catalyst prepared by adding 1,4-dioxane.

400 ml. of commercial gasoline, 0.01 mol of diethylzinc 0.0025 mol of diethylmagnesium, 0.012 mol of water and 12 ml. of 1,4-dioxane were charged, under the atmosphere of nitrogen to the same polymerization vessel as in Example 1. Continuing stirring at a temperature of 25° C. for 300 minutes, the preparation of catalyst was carried out, and then 110 ml. of ethylene oxide, and 0.05 mol of N,N-diethylaniline were charged and allowed to stand overnight at room temperature, whereby 88 g. of polymer having an intrinsic viscosity of 25.4 were obtained.

Example 20

Polymerization of ethylene oxide in the presence of 1,4-dioxane and N,N-dimethylaniline, using a catalyst prepared by adding ethylene oxide and 1,4-dioxane.

400 ml. of commercial gasoline, 10 ml. of ethylene oxide and 0.01 mol of diethylzinc were charged under the atmosphere of nitrogen to the same polymerization vessel as in Example 1. While stirring, 0.012 mol of water, 12 ml. of 1,4-dioxane and 0.0025 mol of diethylmagnesium were added over a period of 90 minutes to complete the preparation of catalyst. To this catalyst solution, 45 ml. of ethylene oxide were charged and stirring was continued for further 150 minutes. Subsequently 55 ml. of ethylene oxide was added. After continuing stirring for further 30 minutes, 0.03 mol of N,N-dimethylaniline was added. Continued stirring for a while, and after stopping it, the reacted mixture was allowed to stand for 40 hours, whereby 95 g. of polymer having an intrinsic viscosity of 29.0 were obtained.

Example 21

Polymerization of ethylene oxide in the presence of diisopropyl ether, using a catalyst prepared by adding dimethylamine.

450 ml. of n-heptane, 0.005 mol of dimethylamine 0.03 mol of dimethylzinc, 0.01 mol of diisopropylmagnesium and 0.027 mol of water were charged under the atmosphere of nitrogen to the same polymerization vessel as in Example 1. After stirring for 300 minutes at the temperature of 25° C., the temperature was raised to 70° C. in 40 minutes. After blowing nitrogen to the reacting system at this temperature to drive off free dimethylamine, 0.09 mol of diisopropyl ether was added and immediately after that the blowing of ethylene oxide was started to carry out the polymerization, whereby 66 g. of polymer having an intrinsic viscosity of 11.5 were obtained in 180 minutes.

Example 22

Polymerization of ethylene oxide in the presence of triethylamine, using a catalyst prepared by adding diethyl ether.

450 ml. of n-heptane, 0.30 mol of diethyl ether, 0.03 mol of diethylzinc and 0.028 mol of water were charged, under the atmosphere of nitrogen to the same polymerization vessel as in Example 1. After stirring for 240 minutes at a temperature of 30° C., 0.05 mol of diethylmagnesium were added and while stirring, the temperature was raised to 70° C. in 40 minutes. At this temperature, nitrogen was blown to the reaction system to drive off free diethyl ether. Subsequently adding 0.005 mol of triethylamine and immediately after that the blowing of ethylene oxide was started to carry out the polymerization, whereby in 180 minutes 71 g. of polymer having an intrinsic viscosity of 14.5 were obtained.

Example 23

Polymerization of ethylene oxide in the presence of triphenylamine and diethyl ether, using a catalyst prepared in the presence of ethylene oxide.

450 ml. of n-heptane, 0.03 mol of diethylzinc, 0.007 mol of diethylmagnesium and 0.03 mol of water were charged, under the atmosphere of nitrogen to the same polymerization vessel as in Example 1. The blowing of ethylene oxide was immediately started. After the temperature rose to 70° C. in 40 minutes while stirring, a mixture of 0.01 mol of triphenylamine and 0.3 mol of diethyl ether was added. By continuing the blowing of ethylene oxide and stirring at this temperature, the polymerization of ethylene oxide was carried out whereby in 180 minutes, 58 g. of polymer having an intrinsic viscosity of 10.1 were obtained.

Example 24

Polymerization of ethylene oxide in the presence of α-trioxymethylene and tri-n-propylamine.

400 ml. of n-heptane, 50 ml. of benzene, 0.03 mol of diethylzinc, 0.01 mol of diethylmagnesium and 0.032 mol of water were charged under the atmosphere of nitrogen to the same polymerization vessel as in Example 1. After stirring for 300 minutes at a temperature of 25° C., the temperature was raised to 70° C. in 40 minutes. After adding 0.03 mol of α-trioxymethylene and 0.03 mol of tri-n-propylamine, the blowing of ethylene oxide was started to carry out the polymerization, whereby in 180 minutes polymers having an intrinsic viscosity of 13.4 were obtained.

Example 25

Polymerization of ethylene oxide with a catalyst prepared by adding dimethyl sulfide and diethylamine.

450 ml, of n-heptane, 0.015 mol of dimethyl sulfide, 0.005 mol of diethylamine, 0.03 mol of diethylzinc, 0.03 mol of diethylmagnesium and 0.026 mol of water were charged under the atmosphere of nitrogen into the same polymerization vessel as in Example 1. After stirring for 300 minutes at a temperature of 30° C., the temperature was raised to 70° C. in 40 minutes. At this temperature, nitrogen was blown to the reaction system, and free dimethyl sulfide and diethylamine were driven off. Subsequently the blowing of ethylene oxide was started to carry out polymerization, whereby in 180 minutes polymers having an intrinsic viscosity of 11.7 were obtained.

Example 26

Polymerization of ethylene oxide in the presence of thiophene and N,N-dimethylaniline, using a catalyst prepared in the presence of ethylene oxide, thiophene and N,N-dimethylaniline.

450 ml. of n-heptane, 0.03 mol of thiophene, 0.06 mol of N,N-dimethylaniline, 0.03 mol of diethylzinc, 0.01 mol of diethylmagnesium and 0.03 mol of water were charged, under the atmosphere of nitrogen at room temperature to the same polymerization vessel as in Example 1. The blowing of ethylene oxide was immediately started and while stirring, the temperature was raised to 70° C. in 40 minutes. Continuing the blowing of ethylene oxide and stirring, the polymerization of ethylene oxide was carried out, whereby in 180 minutes, 55 g. of polymer having an intrinsic viscosity of 11.2 were obtained.

Example 27

Polymerization of propylene oxide with the addition of anisole and triethylamine.

After replacing air in a pressure bottle having a crown cap stopper and 350 ml. inner volume filled with nitrogen, 20 ml. of n-hexane, 0.005 ml. of anisole, 0.005 ml. of triethyl amine, 0.006 mol of water, 0.005 mol of diethylzinc. 0.01 mol of diethylmagnesium and 10 ml. of propylene oxide were charged therein. After closing the mouth with the crown cap stopper, the polymerization was carried out by allowing to stand one day at a room temperature. The result of polymerization are shown in the following table.

| | | | Resultant polymer | |
|---|---|---|---|---|
| Amount of anisole, used (mol) | Amount of triethyl-amine used (mol) | Yield of polymer (percent) | Intrinsic viscosity | Content of insoluble part in cold acetone (percent) |
| 0 | 0 | 20 | 4.9 | 31 |
| 0.005 | 0 | 49 | 6.4 | 35 |
| 0 | 0.005 | 21 | 10.5 | 55 |
| 0.005 | 0.005 | 54 | 13.3 | 56 |

The intrinsic viscosity of resultant polymer was measured by dissolving in benzene at a temperature of 35° C. The content of insoluble part in cold acetone is considered to be a measure indicating crystallinity of propylene oxide polymer. The measurement was carried out at a temperature of 0° C.

Control 5.—When neither anisole triethylamine, nor diethylmagnesium were added and the amount of water was changed to 0.005 mol in the polymerization of Example 27, 18 percent by weight of propylene oxide charged was converted to polymer having an intrinsic viscosity of 2.3. When the amount of water was not reduced, i.e., 0.006 mol of water used, no polymer was produced.

Control 6.—When neither anisole, triethylamine, nor diethylzinc and water were added in the polymerization of Example 27, no polymer was produced.

Example 28

Polymerization of propylene oxide with the addition of diphenyl ether and N,N-dimethylaniline.

The polymerization of propylene oxide was carried out according to the same method as in Example 27 except that instead of anisole and triethylamine, diphenyl ether and N,N-dimethylaniline were used and the amount of diethylmagnesium was changed to 0.005 mol, whereby following result was obtained.

| | | | Resultant polymer | |
|---|---|---|---|---|
| Amount of diphenyl ether used (mol) | Amount of N,N-dimethyl aniline used (mol) | Yield of polymer (percent) | Intrinsic viscosity | Content of insoluble part in cold acetone (percent) |
| 0 | 0 | 24 | 4.5 | 26 |
| 0.005 | 0 | 48 | 5.5 | 30 |
| 0 | 0.010 | 28 | 10.1 | 49 |
| 0.005 | 0.010 | 51 | 15.3 | 52 |

Example 29

Polymerization of propylene oxide with the addition of tetrahydrofuran and pyridine.

The polymerization of propylene oxide was carried out according to the same method as in Example 27 except that instead of anisole and triethylamine, tetrahydrofuran and pyridine were used, the amount of water was changed to 0.0025 mol and the period of standing was changed to 2 days, whereby the following result was obtained.

| Amount of tetrahydrofuran used (mol) | Amount of pyridine used (mol) | Intrinsic viscosity of resultant polymer |
|---|---|---|
| 0 | 0 | 4.5 |
| 0.0025 | 0 | 5.0 |
| 0 | 0.001 | 6.8 |
| 0.0025 | 0.001 | 11.1 |

Example 30

Polymerization of propylene oxide with the addition of diphenyl sulfide and triethylenediamine.

The polymerization of propylene oxide was carried out according to the same method as in Example 27 except that instead of anisole and triethylamine, diphenyl sulfide and triethylenediamine were used and the amount of diethylmagnesium and water were changed to 0.0025 and 0.005 mol, respectively, whereby following result was obtained.

| | | | Resultant polymer | |
|---|---|---|---|---|
| Amount of diphenyl sulfide used (mol) | Amount of triethylene-diamine used (mol) | Yield of polymer (percent) | Intrinsic viscosity | Content of insoluble part in cold acetone (percent) |
| 0 | 0 | 20 | 4.6 | 30 |
| 0.005 | 0 | 31 | 6.1 | 34 |
| 0 | 0.005 | 24 | 8.6 | 47 |
| 0.005 | 0.005 | 35 | 12.5 | 53 |

Example 31

Replacing air in a pressure bottle having 350 ml. of inner volume and a crown cap stopper with nitrogen, 0.15 mol of propylene oxide, 0.2 mol of allylglycidyl ether, 0.01 mol of diethylzinc, 0.0025 mol of diethylmagnesium and 0.011 mol of water were charged to the bottle. Closing the mouth with the crown cap stopper, the bottle was allowed to stand one day at room temperature whereby 2.4 g. of copolymer was obtained.

Example 32

Copolymerization of propylene oxide and allylglycidyl ether with the addition of 1,4-dioxane and N,N-dimethylaniline.

The copolymerization of propylene oxide and allylglycidyl ether was carried out according to the method in Example 31 except that 0.03 mol of 1,4-dioxane, 0.01 mol of N,N-dimethylaniline were charged together with monomeric components and catalyst components and the polymerization conditions were changed to 30° C. and 2 days, whereby 5.5 g. of copolymer were obtained. The intrinsic viscosity of resultant copolymer measured in benzene solution at a temperature of 35° C. was 8.8.

Example 33

The air in a 350 ml. pressure bottle, which is equipped with a crown cap stopper, was replaced with nitrogen and charged with 20 ml. of n-hexane, 0.2 mol of ethylene oxide, 0.01 mol of epichlorohydrin, 0.005 mol of diethylzinc, 0.001 mol of diethylmagnesium and 0.005 mol of water, and the stopper applied. The bottle was allowed to stand for one day for polymerization whereby 5.3 grams of the copolymer were obtained. The intrinsic viscosity of the copolymer measured in water at 35° C. was 5.8.

Example 34

Copolymerization of ethylene oxide and propylene oxide with a catalyst prepared in the presence of propylene oxide.

Into the same polymerization apparatus as in Example 1, under nitrogen atmosphere, 450 ml. of n-heptane, 0.03 mol of diethylzinc, 0.01 mol of diethylmagnesium, 0.03 mol of water and 0.5 mol of propylene oxide was charged and stirred for 240 minutes to prepare the catalyst. 100 ml. of ethylene oxide was added thereto and allowed to stand at room temperature overnight, whereby 64 grams of water soluble copolymer was obtained. The intrinsic viscosity of this copolymer measured in water at 350° C. was 4.3.

What is claimed is:

1. In a process for the production of high molecular weight polymers of epoxides by the polymerization of an epoxide of the formula:

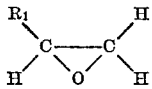

wherein $R_1$ represents a member selected from the group consisting of a hydrogen atom, methyl, ethyl, phenyl, vinyl, chloromethyl, bromomethyl, methoxymethyl, allyloxymethyl and phenoxymethyl radicals, the improvement which comprises conducting said polymerization at a temperature of about −50° to 150° C. in the presence of a three component catalyst consisting essentially of water, an organozinc compound of the formula:

$$R_5—Zn—R_6$$

and an organomagnesium compound of the formula:

$$R_7—Mg—R_8$$

wherein in the two formulas, $R_5$, $R_6$, $R_7$ and $R_8$ each represent an alkyl radical of 1 to 4 carbon atoms, the said catalyst being present in an amount of about 0.005 to 0.1 mol of the total organozinc compound and the organomagnesium compound per mol of the charged epoxide and containing about 0.16 to 2.5 mols of water per mol of the total organozinc compound and the organomagnesium compound, the molar ratio of the organozinc compound to the organomagnesium compound in said catalyst being about 1:0.01 to 1:2.

2. The process according to claim 1, wherein the epoxide is ethylene oxide.

3. The process according to claim 1, wherein the epoxide is propylene oxide.

4. The process according to claim 1, wherein the polymerization is conducted in the presence of an inert liquid medium of at least one material selected from the group consisting of saturated aliphatic hydrocarbons, saturated alicyclic hydrocarbons and aromatic hydrocarbons.

5. The process according to claim 4, wherein the inert liquid medium is at least one saturated aliphatic hydrocarbon, the epoxide is ethylene oxide and the polymerization is conducted at a temperature of about −20° to 100° C.

6. The process according to claim 4, wherein the inert liquid medium is at least one saturated alicyclic hydrocarbon, the epoxide is ethylene oxide and the polymerization is conducted at a temperature of about −20° to 100° C.

7. The process according to claim 1, wherein at least two different epoxides are copolymerized.

8. The process according to claim 7, wherein the epoxides are ethylene oxide and propylene oxide.

9. The process according to claim 7, wherein the epoxides are propylene oxide and allylglycidyl ether.

10. The process according to claim 1, wherein the polymerization is conducted in the presence of at least one additive selected from the group consisting of tetrahydrofuran; 1,4-dioxane; α-trioxymethylene; compounds having the formula: $R_9—O—R_{10}$ wherein $R_9$ and $R_{10}$ each represent a residue selected from the group consisting of alkyl radicals having 1 to 4 carbon atoms, and methoxymethyl, 2-methoxyethyl, 1-ethoxyethyl, 2-ethoxyethyl, cyclohexyl, phenyl, benzyl and tolyl radicals; thiophene; methylthiophene; thioformaldehyde; thioacetaldehyde; dithioacetone; trithioacetone; compounds having the formula: $R_{11}—S—R_{12}$ wherein $R_{11}$ and $R_{12}$ each represent a residue selected from the group consisting of alkyl radicals having 1 to 4 carbon atoms, and cyclohexyl, phenyl, benzyl, tolyl, thiomethoxymethyl and 1-thioethoxyethyl radicals; triethylenediamine; hexamethylenetetramine; pyridine; diethylenediamine; and compounds having the formula:

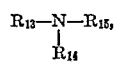

wherein $R_{13}$ and $R_{14}$ each represent a member selected from the group consisting of a hydrogen atom, alkyl radicals of 1 to 4 carbon atoms and cyclohexyl, phenyl and benzyl radicals and $R_{15}$ represents a residue selected from the group consisting of alkyl radicals of 1 to 4 carbon atoms and cyclohexyl, phenyl and benzyl radicals, the molar ratio of said additive to total amount of the organozinc compound and the organomagnesium compound being more than 0.01.

11. The process according to claim 10, wherein the epoxide is ethylene oxide.

12. The process according to claim 10, wherein the epoxide is propylene oxide.

13. The process according to claim 10, wherein the additive is 1,4-dioxane.

14. The process according to claim 13, wherein the epoxide is ethylene oxide.

15. The process according to claim 13, wherein the epoxide is propylene oxide.

16. The process according to claim 10, wherein the additive is N,N-dimethylaniline and said additive is introduced during the polymerization step.

17. The process according to claim 16, wherein the epoxide is ethylene oxide.

18. The process according to claim 16, wherein the epoxide is propylene oxide.

19. The process according to claim 10, wherein the additive is 1,4-dioxane and N,N-dimethylaniline.

20. The process according to claim 19, wherein the epoxide is ethylene oxide.

21. The process according to claim 19, wherein the epoxide is propylene oxide.

22. The process according to claim 19, wherein 1,4-dioxane is incorporated into the catalyst and N,N-dimethylaniline is introduced during the polymerization step.

23. The process according to claim 22, wherein the epoxide is ethylene oxide.

24. The process according to claim 22, wherein the epoxide is propylene oxide.

25. The process according to claim 23, wherein the organozinc compound is diethylzinc and the organomagnesium compound is diethylmagnesium.

26. The process according to claim 10, wherein at least two different epoxides are copolymerized.

27. The process according to claim 26, wherein the epoxides are ethylene oxide and propylene oxide.

28. The process according to claim 26, wherein the epoxides are propylene oxide and allylglycidyl ether.

29. The process according to claim 26, wherein the additive is 1,4-dioxane.

30. The process according to claim 26, wherein the additive is N,N-dimethylaniline.

31. The process according to claim 26, wherein the additive is 1,4-dioxane and N,N-dimethylaniline.

32. The process according to claim 10, wherein the polymerization is effected in the presence of an inert liquid medium of at least one material selected from the group consisting of saturated aliphatic hydrocarbons, saturated alicyclic hydrocarbons and aromatic hydrocarbons.

33. The process according to claim 32, wherein the inert liquid medium is at least one saturated aliphatic hydrocarbon, the epoxide is ethylene oxide and the polymerization is conducted at a temperature of about −20° to 100° C.

34. The process according to claim 32, wherein the additive is 1,4-dioxane and N,N-dimethylaniline.

35. The process according to claim 34, wherein 1,4-dioxane is incorporated into the catalyst and N,N-dimethylaniline is introduced during the polymerization step.

36. A catalyst composition for polymerizing expoxides of the formula:

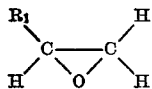

wherein $R_1$ represents a member selected from the group consisting of a hydrogen atom, methyl, ethyl, phenyl, vinyl, chloromethyl, bromoethyl, methoxymethyl, allyloxymethyl and phenoxymethyl radicals, said catalyst consisting essentially of about 0.16 to 2.5 mols of water per mol of the total organozinc compound of the formula $R_5$—Zn—$R_6$ and the organomagnesium compound of the formula $R_7$—Mg—$R_8$ in which two formulas, $R_5$, $R_6$, $R_7$ and $R_8$ each represent an alkyl radical of 1 to 4 carbon atoms, the molar ratio of the organozinc compound to the organomagnesium compound being 1:0.01 to 1:2.

37. The catalyst composition as defined in claim 36, wherein said catalyst further contains at least one additive selected from the group consisting of tetrahydrofuran; 1,4-dioxane; α-trioxymethylene; compounds of the formula: $R_9$—O—$R_{10}$ wherein $R_9$ and $R_{10}$ each represent a residue selected from the group consisting of alkyl radicals of 1 to 4 carbon atoms and methoxymethyl, 2-methoxyethyl, 1-ethoxyethyl, 2-ethoxyethyl, cyclohexyl, phenyl, benzyl and tolyl radicals; thiophene; methylthiophene; thioformaldehyde; thioacetaldehyde; dithioacetone; trithioacetone; compounds of the formula:

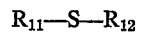

wherein $R_{11}$ and $R_{12}$ each represent a residue selected from the group consisting of alkyl radicals of 1 to 4 carbon atoms and cyclohexyl, phenyl, tolyl, thiomethoxymethyl and 1-thioethoxyethyl radicals; triethylenediamine; hexamethylenetetramine; pyridine; diethylenediamine; and compounds of the formula:

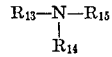

wherein $R_{13}$ and $R_{14}$ each represent a member selected from the group consisting of an hydrogen atom, alkyl radicals of 1 to 4 carbon atoms and cyclohexyl, phenyl and benzyl radicals, and $R_{15}$ represents a member selected from the group consisting of alkyl radicals of 1 to 4 carbon atoms and cyclohexyl, phenyl and benzyl radicals, the molar ratio of said additive to total amount of the organozinc compound and the organomagnesium compound being more than 0.01.

References Cited

UNITED STATES PATENTS 3,313,741  4/1967  Uelzmann et al.
2,870,100  1/1959  Stewart et al.

OTHER REFERENCES

Polyethers (Part I) N. Gaylord vol. XIII, July 1963 (pp. 213–215).

Journal of Polymer Science vol. 47, Issue 149 (1960), (pp. 486–4).

WILLIAM H. SHORT, *Primary Examiner.*

T. PERTILLA, *Assistant Examiner.*

U.S. Cl. X.R.

252—431; 260—33.2, 47, 88.3, 615